(12) United States Patent
Koizumi et al.

(10) Patent No.: US 10,250,113 B2
(45) Date of Patent: Apr. 2, 2019

(54) ELECTRIC MOTOR AND MANUFACTURING METHOD FOR ELECTRIC MOTOR

(71) Applicant: NSK Ltd., Tokyo (JP)

(72) Inventors: Kazunori Koizumi, Kanagawa (JP); Hayao Watanabe, Kanagawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/061,785

(22) PCT Filed: Jul. 18, 2017

(86) PCT No.: PCT/JP2017/025988
§ 371 (c)(1),
(2) Date: Jun. 13, 2018

(87) PCT Pub. No.: WO2018/016495
PCT Pub. Date: Jan. 25, 2018

(65) Prior Publication Data
US 2018/0367018 A1    Dec. 20, 2018

(30) Foreign Application Priority Data

Jul. 22, 2016 (JP) ................. 2016-143926

(51) Int. Cl.
*H02K 1/06* (2006.01)
*H02K 21/16* (2006.01)
(Continued)

(52) U.S. Cl.
CPC ............... *H02K 21/16* (2013.01); *H02K 1/16* (2013.01); *H02K 1/2706* (2013.01)

(58) Field of Classification Search
CPC ...... H02K 1/2706; H02K 21/16; H02K 1/148; H02K 16/00; Y10T 29/49009; Y10T 29/49078
(Continued)

(56) References Cited

U.S. PATENT DOCUMENTS 2,206,308 A * 7/1940 Schurch ............... H02K 17/04
                                                          310/198
2,235,903 A * 3/1941 Schonfelder ......... H02K 1/16
                                                          310/216.094
(Continued)

FOREIGN PATENT DOCUMENTS

JP    63-174531 A    7/1988
JP    05-344665 A    12/1993
(Continued)

OTHER PUBLICATIONS

Notification of Reason for Refusal of JP Patent Application No. 2016-143926 dated Dec. 20, 2017.
(Continued)

*Primary Examiner* — Thanh Lam
(74) *Attorney, Agent, or Firm* — Sughrue Mion, PLLC

(57) ABSTRACT

An electric motor includes: a rotor having a rotor yoke and a magnet; and a stator formed by stacking, in a rotation axis direction of the rotor, a plurality of electromagnetic steel sheet layers in each of which a plurality of electromagnetic steel sheets each having two teeth is annularly arranged. A core of a coil provided in the stator is formed of the teeth stacked in the rotation axis direction, there are two types of phases for arrangement of a plurality of electromagnetic steel sheets in one electromagnetic steel sheet layer, and the stator includes the electromagnetic steel sheet layers having the two types of phases.

8 Claims, 16 Drawing Sheets

(51) Int. Cl.
*H02K 1/27* (2006.01)
*H02K 1/16* (2006.01)

(58) Field of Classification Search
USPC .................................................. 310/112–114
See application file for complete search history.

(56) References Cited

U.S. PATENT DOCUMENTS

| | | | | |
|---|---|---|---|---|
| 5,859,486 | A * | 1/1999 | Nakahara | H02K 1/14 |
| | | | | 310/216.004 |
| 7,750,521 | B2 | 7/2010 | Qu et al. | |
| 8,063,527 | B2 | 11/2011 | Qu et al. | |
| 8,866,362 | B2 * | 10/2014 | Bagepalli | H02K 21/12 |
| | | | | 310/216.016 |
| 2011/0187222 | A1 * | 8/2011 | Li | H02K 1/148 |
| | | | | 310/216.016 |
| 2015/0042194 | A1 | 2/2015 | Li et al. | |
| 2017/0237303 | A1 * | 8/2017 | Fahrenbach | H02K 21/12 |
| | | | | 310/216.074 |

FOREIGN PATENT DOCUMENTS

| | | |
|---|---|---|
| JP | 2008-148550 A | 6/2008 |
| JP | 2014-007948 A | 1/2014 |
| JP | 2015-037379 A | 2/2015 |
| TW | 201223081 A1 | 6/2012 |
| TW | 201535934 A | 9/2015 |

OTHER PUBLICATIONS

International Search Report of PCT/JP2017/025988 dated Oct. 10, 2017 [PCT/ISA/210].
Communication dated Jul. 5, 2018 issued by the Intellectual Property Office of Taiwan in counterpart application in No. 106124285.

* cited by examiner

ELECTRIC MOTOR AND MANUFACTURING METHOD FOR ELECTRIC MOTOR

CROSS REFERENCE TO RELATED APPLICATIONS

This application is a National Stage of International Application No. PCT/JP2017/025988, filed Jul. 18, 2017, claiming priority based on Japanese Patent Application No. 2016-143926, filed Jul. 22, 2016.

FIELD

The present invention relates to an electric motor and a manufacturing method for an electric motor.

BACKGROUND

There is a known manufacturing method for an electric motor in which a motor core is formed by stacking annular electromagnetic steel sheets (e.g., Patent Literature 1). Such an electromagnetic steel sheet is formed by punching processing as an annular member having a large number of teeth to be an iron core of a coil.

CITATION LIST

Patent Literature

Patent Literature 1: JP 2014-7948 A

SUMMARY

Technical Problem

However, in a case of forming a large number of teeth at the same time by punching processing, the larger the number of teeth is, the more hardly an error in a shape of each tooth shape can be suppressed. Therefore, according to a conventional method, there is a problem that non-uniformity is easily caused in shapes of respective teeth.

Also, according to the conventional method, there is a problem that non-uniformity is easily caused in magnetic characteristics of the respective teeth because an annular integrated member itself has a magnetic orientation. When a non-oriented electromagnetic steel sheet is used, such an influence of the magnetic orientation property is likely to be reduced, but it is difficult to reduce the influence to zero, and the problem is not solved fundamentally.

Additionally, an annular electromagnetic steel sheet can hardly secure rigidity, and there may be a problem in securing rigidity of a motor core although the electromagnetic steel sheets are stacked.

The present invention is directed to providing an electric motor and a manufacturing method for an electric motor in which non-uniformity caused in shapes and magnetic characteristics of teeth can be further reduced and sufficient rigidity can be obtained.

Solution to Problem

To achieve the above-described object, an electric motor according to the present invention includes a rotor having a rotor yoke and a magnet, and a stator formed by stacking, in a rotation axis direction of the rotor, a plurality of electromagnetic steel sheet layers in each of which a plurality of electromagnetic steel sheets each having two teeth is annularly arranged. A core of a coil provided in the stator is formed of the teeth stacked in the rotation axis direction, there are two types of phases for arrangement of a plurality of the electromagnetic steel sheets in the one electromagnetic steel sheet layer, and the stator includes electromagnetic steel sheet layers having the two types of phases.

Additionally, to achieve the above-described object, a manufacturing method for an electric motor, includes forming a stator by stacking a plurality of electromagnetic steel sheet layers in which a plurality of electromagnetic steel sheets each having two teeth is annularly arranged, and providing a coil in which the stacked teeth serves as a core. There are two types of phases for arrangement of a plurality of the electromagnetic steel sheets in one electromagnetic steel sheet layer, and the stator includes electromagnetic steel sheet layers having the two types of phases.

Therefore, since the above-described electromagnetic steel sheets are annularly arranged while one electromagnetic steel sheet has the two teeth, the larger number of teeth can be provided by one electromagnetic steel sheet layer, and therefore, non-uniformity in the shapes of the teeth can be further reduced. In other words, since two teeth are integrally formed in one electromagnetic steel sheet, accuracy for consistency in the shapes of all of the teeth can be secured by securing accuracy for consistency in the shapes of the two teeth. Additionally, since a plurality of electromagnetic steel sheets is annularly arranged in one electromagnetic steel sheet layer, even in a case where one electromagnetic steel sheet has a magnetic orientation property, one electromagnetic steel sheet layer is hardly dominated by the magnetic orientation property owned by this one electromagnetic steel sheet, and non-uniformity in the magnetic characteristic of respective teeth can be further reduced. Furthermore, since stacked are electromagnetic steel sheet layers using two different types of phases in each of which electromagnetic steel sheets each having two teeth are annularly arranged, sufficient rigidity can be secured by a three-dimensional structure formed by stacking the electromagnetic steel sheet layers having the different phases.

In the present invention, phases each arranged with the electromagnetic steel sheets are shifted from each other by one tooth between the two types of phases.

Therefore, electromagnetic steel sheets each having two teeth are alternately arranged at a position where electromagnetic steel sheet layers having the different phases are stacked. Therefore, since an annularly continuous structure can be formed by stacking the electromagnetic steel sheets having the different phases, sufficient rigidity can be secured as an annular structure body.

In the present invention, the electromagnetic steel sheet arranged in the electromagnetic steel sheet layer has the two teeth projecting toward an opposite side of the rotor from a base portion located on the rotor side with respect to the two teeth, and the two teeth included in the electromagnetic steel sheet are not continuously formed on the opposite side of the rotor.

Therefore, a coil preliminarily formed can be fitted into a core formed by stacking the teeth, and the coil can be easily provided.

In the present invention, a plurality of the electromagnetic steel sheets included in the one electromagnetic steel sheet layer is arranged apart from each other.

Therefore, more weight reduction can be achieved compared to a structure where an electromagnetic steel sheet layer is completely annularly continuous. Additionally, magnetism mutually generated between coils in each of which stacked teeth serves as a core can be suppressed from sneaking around, and efficiency of the electric motor can be further improved.

In the present invention, the number of electromagnetic steel sheet layers having one of the two types of phases is equal to the number of electromagnetic steel sheet layers having the other type.

Therefore, an entire stator can be easily well balanced in its strength and magnetic characteristics.

In the present invention, electromagnetic steel sheet layers adjacent to each other in the rotation axis direction have different phases for arrangement of a plurality of the electromagnetic steel sheets.

Therefore, the electromagnetic steel sheets each having two teeth are alternately arranged at a position where the two electromagnetic steel sheet layers are stacked. Therefore, since an annularly continuous structure can be formed by stacking the electromagnetic steel sheets having different phases, sufficient rigidity can be more surely secured as the annular structure body.

In the present invention, in a base portion physically connecting the two teeth in one electromagnetic steel sheet, a portion corresponding to a middle point between the two teeth is formed thinner than other portions.

Therefore, magnetism mutually generated between the coils adjacent to each other in the annular direction can be suppressed from sneaking around, and efficiency of the electric motor can be further improved.

In the present invention, the stator has a cylindrical yoke provided on an opposite side of the rotor with respect to the teeth, and the yoke is integrally formed in the rotation axis direction.

Therefore, since the stator is supported by a yoke integrally formed in the stacking direction of electromagnetic steel sheet layers, sufficient rigidity can be more surely secured.

Advantageous Effects of Invention

According to the present invention, non-uniformity in shapes and magnetic characteristics of teeth can be further reduced, and sufficient rigidity can be obtained.

DESCRIPTION OF EMBODIMENTS

In the following, embodiments of the present invention will be described with reference to the drawings, but the present invention is not limited thereto. The requirements in the respective embodiments described below can be suitably combined. Also, some of constituent elements may not be used.

First Embodiment

Figure 1:
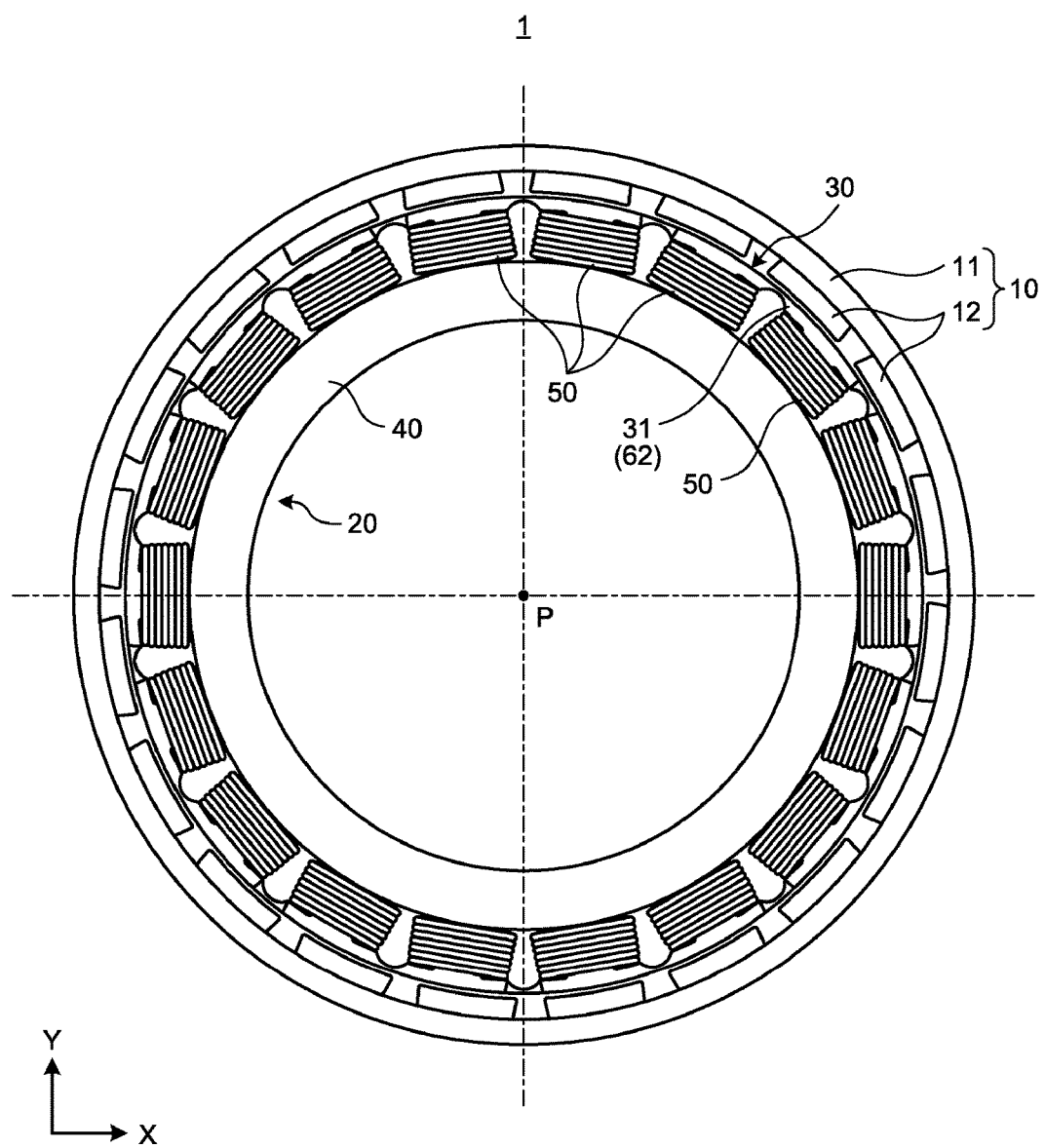
FIG. 1 is a diagram illustrating main components of an electric motor according to a first embodiment of the present invention.

FIG. 1 is a diagram illustrating main components of an electric motor 1 according to a first embodiment of the present invention. The electric motor 1 includes, for example, a rotor 10 and a stator 20 positioned on an inner side of the rotor 10. The rotor 10 has a rotor yoke 11 and a magnet 12. Specifically, the rotor 10 includes, for example: the cylindrical rotor yoke 11; and a plurality of magnets 12 annularly arranged on the rotor yoke 11 along a stator side (inner peripheral surface in the case of FIG. 1). The rotor 10 is rotated in accordance with a magnetic flux generated by a coil 50 provided in the stator 20. A rotation axis P of the rotor 10 corresponds to a cylindrical center axis of the rotor yoke 11.

The stator 20 includes: a stator yoke 30 provided with a coil 50; and a stator back yoke 40 provided on a side where the coil 50 of the stator yoke 30 is provided (inner side in the case of FIG. 1). The stator yoke 30 includes: an annular edge portion 31 positioned on an outer peripheral side; and four or more core portions 32 projecting inward from the edge portion 31 (refer to FIGS. 2 and 3). A coil 50 is provided in each of the core portions 32. The stator yoke 30 has a stacked structure formed of stacked electromagnetic steel sheet layers in each of which electromagnetic steel sheets 60 described later are annularly arranged (refer to FIGS. 2 to 4). With this stacked structure, an entire portion of the edge portion 31 is positioned in a manner conforming to a cylindrical shape having the rotation axis P as a center axis. Additionally, the four or more core portions 32 and the coils 50 are arranged annularly on an inner side of the edge portion 31 while setting the rotation axis P as the center axis. The stator back yoke 40 is a cylindrical member positioned on an opposite side of the rotor 10 with respect to the core portions 32. The stator back yoke 40 is provided as an integrated member in the rotation axis direction. Specifically, the stator back yoke 40 is the cylindrical member made of, for example, iron or a powder magnetic core (dust core).

In the following description, a rotation axis direction may be referred to as a Z direction. Additionally, note that two directions along a plane orthogonal to the Z direction and orthogonal to each other may be referred to as an X direction and a Y direction respectively in order to clarify a difference between phases (refer to FIGS. 5 and 6) in the drawings.

Figure 2:
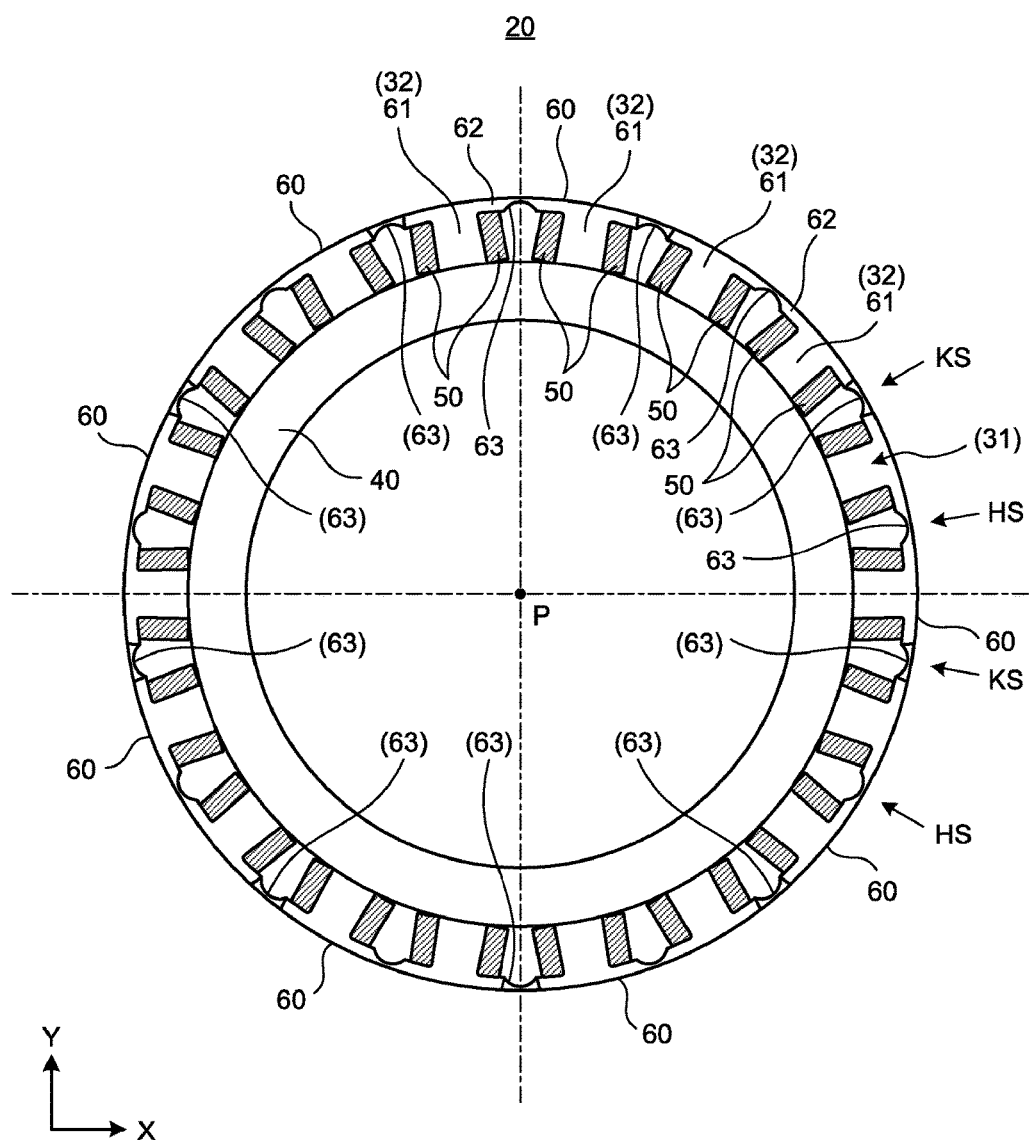
FIG. 2 is a diagram illustrating an example of a specific structure of a stator according to the first embodiment.
Figure 3:
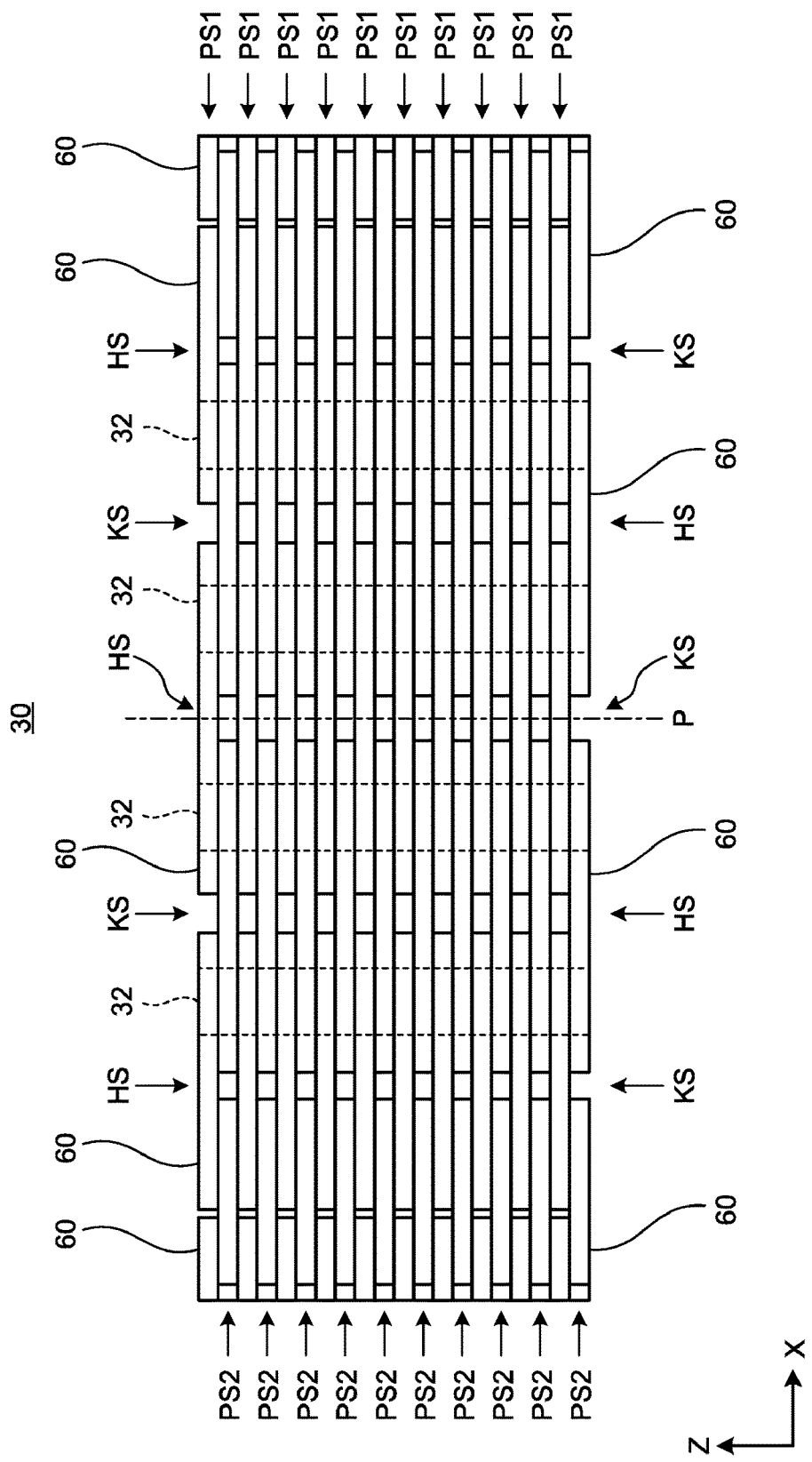
FIG. 3 is a diagram illustrating a stacked structure of electromagnetic steel sheet layers included in a stator yoke according to the first embodiment.
Figure 4:
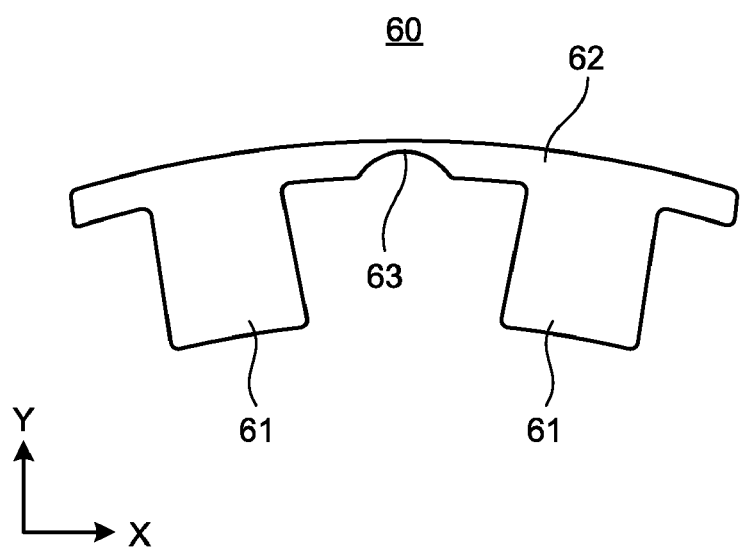
FIG. 4 is a diagram illustrating one electromagnetic steel sheet according to the first embodiment.

Next, the stator 20 and the stator yoke 30 will be described in more detail. FIG. 2 is a diagram illustrating an example of a specific structure of the stator 20 according to the first embodiment. In FIG. 2, the stator 20 is viewed in the Z direction. Additionally, in FIG. 2, a part of a winding wire of a coil 50 wound around each core portion 32 in FIG. 1 is omitted in order to clarify teeth 61 constituting each core portion 32. FIG. 3 is a diagram illustrating a stacked structure of electromagnetic steel sheet layers included in the stator yoke 30 according to the first embodiment. In FIG. 3, the stator yoke 30 is viewed in one direction (e.g., Y direction) orthogonal to the Z direction. FIG. 4 is a view illustrating one electromagnetic steel sheet 60 according to the first embodiment.

As illustrated in FIG. 3, for example, the stator yoke 30 has a structure in which a plurality of electromagnetic steel sheet layers is stacked in the Z direction. As illustrated in FIGS. 2 and 3, a plurality of electromagnetic steel sheets 60 is annularly arranged in one electromagnetic steel sheet layer. As illustrated in FIGS. 2 and 4, each electromagnetic steel sheet 60 has two teeth 61. With this stacked structure, the stator yoke 30 is formed with a core portion 32 of a coil 50 by stacking teeth 61 of electromagnetic steel sheets 60 included in each of the plurality of electromagnetic steel sheet layers. In other words, a core portion 32 functioning as a core of a coil 50 provided in the stator 20 is formed of teeth 61 stacked in the Z direction as illustrated in FIG. 3, for example.

One electromagnetic steel sheet 60 has a base portion 62 that physically connects two teeth 61 as illustrated in FIG. 4, for example. Specifically, the base portion 62 has, for example, an arc shape and causes the two teeth 61 included in one electromagnetic steel sheet 60 to be positioned apart from each other at a predetermined distance. A plurality of electromagnetic steel sheets 60 is annularly arranged in one electromagnetic steel sheet layer and a plurality of electromagnetic steel sheet layers is stacked, thereby forming the edge portion 31 while base portions 62 contact each other. In the present embodiment, two teeth 61 included in an electromagnetic steel sheet 60 are not continuously formed on the opposite side of the rotor 10. Specifically, a tip of one tooth 61 is arranged apart from the other adjacent tooth 61 on the opposite side of the base portion 62 as illustrated in FIG. 4, for example. Thus, a gap (slot) is provided between two teeth 61 provided in a manner projecting from the base portion 62 with respect to the radial direction of the stator yoke 30. Additionally, each of the electromagnetic steel sheets 60 arranged in an electromagnetic steel sheet layer has two teeth 61 projecting toward the opposite side of the rotor 10 from each base portion 62 positioned on the rotor side with respect to the two teeth 61.

More specifically, in the electric motor 1 of a so-called outer rotor as illustrated in FIG. 1, two teeth 61 projecting toward the inside of an arc included in a base portion 62 are provided in an electromagnetic steel sheet 60. The base portion 62 does not necessarily have an arc shape. As illustrated in FIG. 4 and the like, for example, a side of a base portion 62 from which teeth 61 project may have be a straight line orthogonal to the projecting direction of the teeth 61. The electromagnetic steel sheet 60 illustrated in FIG. 4 has a shape in which, for example, upper sides of two T shapes are connected by the two teeth 61 projecting from the base portion 62. A coil 50 is locked with respect to the radial direction at the base portion 62 having both side portions in a circumferential direction projecting like the upper sides of the T shapes relative to the teeth 61 constituting a core portion 32. With this structure, a winding wire of a coil 50 can be prevented from extending, protruding, or the like in a direction in which the rotor 10 is positioned. Additionally, a base portion 62 has an ark-shaped side out of the upper sides of the connected T shapes, from which teeth 61 does not project.

In each base portion 62, a portion corresponding to a middle point between two teeth 61 included in one electromagnetic steel sheet 60 is thinner than other portions. More specifically, for example, an intermediate portion 63 corresponding to the middle point has a shape in which a radially inner side is curved like a gulf station shape of a cross-section of a concave lens, and a radial thickness of the base portion 62 is formed thinner. Provided is the structure in which a plurality of teeth 61 is stacked in the rotation axis direction and forms a core portion 32 and a coil 50 is provided therein, however; magnetic interference may be caused by magnetism sneaking around between adjacent coils 50. Preferably, such magnetic interference is further reduced in the viewpoint of improving efficiency of the electric motor 1. The magnetism is more likely to sneak around in a closed slot HS where two teeth 61 are physically connected than in an open slot KS where two teeth 61 are not physically connected. Additionally, the magnetism is more likely to sneak around when a physical continuity level in the closed slot HS is high. Therefore, in the present embodiment, a portion corresponding to a middle point between two teeth 61 is formed thinner than other portions, thereby suppressing magnetism from sneaking around. With this structure, deterioration of efficiency caused by magnetic interference can be suppressed, and efficiency of the electric motor 1 can be further improved. Meanwhile, the intermediate portion 63 indicated by a reference sign with a parenthesis in FIG. 2 represents an intermediate portion 63 of an electromagnetic steel sheet 60 arranged in an electromagnetic steel sheet layer different from an electromagnetic steel sheet layer where an electromagnetic steel sheet 60 having an intermediate portion 63 indicated by a reference sign without a parenthesis is arranged.

Next, an electromagnetic steel sheet layer will be described. There are two types of phases for arrangement of a plurality of electromagnetic steel sheets 60 in one electromagnetic steel sheet layer. The stator 20 includes electromagnetic steel sheet layers having the two types of phases. Specifically, between the two types of phases, the phases each arranged with electromagnetic steel sheets 60 are shifted from each other by one tooth.

Figure 5:
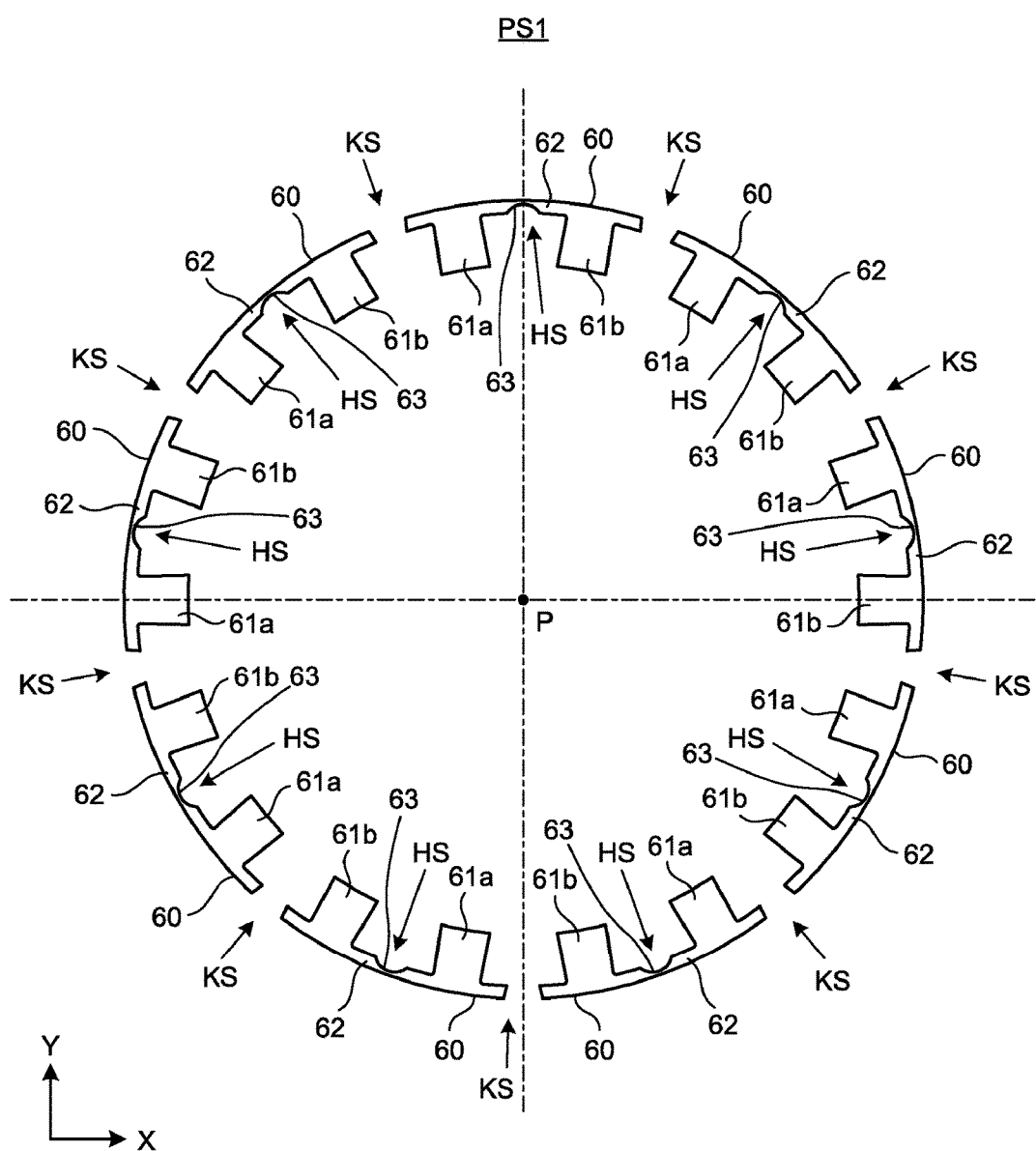
FIG. 5 is a diagram illustrating one of two types of phases for arrangement of a plurality of electromagnetic steel sheets in one electromagnetic steel sheet layer.
Figure 6:
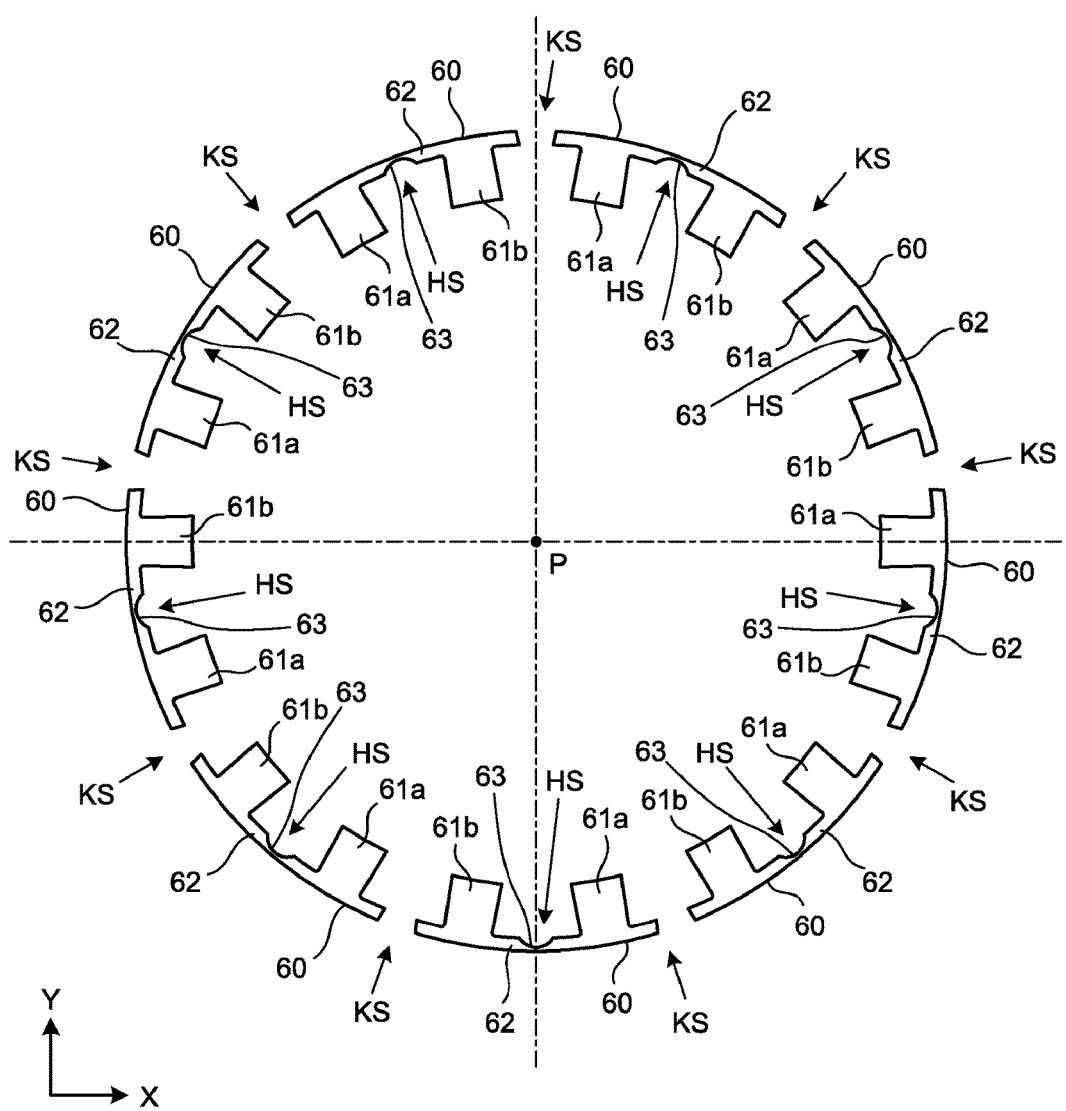
FIG. 6 is a diagram illustrating the other one of the two types of phases for arrangement of a plurality of electromagnetic steel sheets in one electromagnetic steel sheet layer.

FIG. 5 is a diagram illustrating one of two types of phases for arrangement of a plurality of electromagnetic steel sheets 60 in one electromagnetic steel sheet layer. FIG. 6 is a diagram illustrating the other one of the two types of phases for arrangement of a plurality of electromagnetic steel sheets 60 in one electromagnetic steel sheet layer. A difference between FIG. 5 and FIG. 6 represents an arrangement difference between electromagnetic steel sheets 60 having different phases when viewed in the same direction. In the following, one phase illustrated in FIG. 5 may be referred to as a first phase. Additionally, the other phase illustrated in FIG. 6 may be referred to as a second phase. Reference sign PS1 represents an electromagnetic steel sheet layer of the first phase. Reference sign PS2 represents an electromagnetic steel sheet layer of the second phase. Since the phases in each of which electromagnetic steel sheets 60 are arranged are shifted from each other by one tooth between two phases, arrangement of two teeth 61 included in one electromagnetic steel sheet 60 becomes alternate between the two phases. Specifically, at a position in the first phase where one (tooth 61a) out of teeth 61a, 61b corresponding to two teeth 61 included in one electromagnetic steel sheet 60 is arranged, the other (tooth 61b) is positioned in the second phase, for example. Also, at a position of the second phase where one (tooth 61a) out of the teeth 61a, 61b included in one electromagnetic steel sheet 60 is arranged, the other (tooth 61b) is positioned in the first phase. In FIGS. 5 and 6, one of two teeth 61 is denoted by reference sign 61a, and the other one is denoted by reference sign 61b in order to differentiate one phase from the other.

In the present embodiment, a plurality of electromagnetic steel sheets 60 included in one electromagnetic steel sheet layer is arranged apart from each other. Specifically, the electromagnetic steel sheets 60 annularly arranged in one electromagnetic steel sheet layer do not contact each other. More specifically, electromagnetic steel sheets 60 are arranged in the annular arrangement direction of one electromagnetic steel sheet layer such that a distance between two teeth 61 which are two teeth 61 respectively included in different electromagnetic steel sheets 60 and located adjacent to each other in the non-contact state becomes equal to a distance between two teeth 61 included in one electromagnetic steel sheet 60. Thus, a distance between two teeth 61 annularly arranged is equal regardless of whether a gap (slot) between two teeth 61 is a gap (closed slot HS) between two teeth 61 included in one electromagnetic steel sheet 60 or a gap (open slot KS) between two teeth 61 included in different electromagnetic steel sheets 60.

In the present embodiment, each electromagnetic steel sheet 60 has a shape in which a distance between two teeth 61 which are two teeth 61 respectively included in different electromagnetic steel sheets 60 and located adjacent to each other in a non-contact state can be equalized to a distance between two teeth 61 included in one electromagnetic steel sheet 60. Specifically, an extension length of a portion of the base portion 62, which extends to connect two teeth 61 included in one electromagnetic steel sheet 60, is twice or more an extension length of a portion projecting from each tooth 61 in an opposite direction of the extending direction.

In the present embodiment, adjacent electromagnetic steel sheet layers have phases having different arrangement of a plurality of electromagnetic steel sheets 60. Specifically, the stator yoke 30 is formed by alternately stacking an electromagnetic steel sheet layer of the first phase PS1 and an electromagnetic steel sheet layer of the second phase PS2 as illustrated in FIG. 3, for example. Therefore, an open slot KS and a closed slot HS are alternately arranged in the axial direction. Furthermore, in the present embodiment, the number of electromagnetic steel sheet layers having one of the two types of phases is equal to the number of electromagnetic steel sheet layers having the other type thereof as illustrated in FIG. 3, for example. In this case, a slot of the stator yoke 30 is to be a slot (semi-closed slot) in which every two electromagnetic steel sheet layers stacked in the rotation axis direction has one layer having an open slot KS and one layer having a closed slot HS. With this structure, more weight reduction is achieved than in a structure in which one electromagnetic steel sheet layer is completely annularly continuous and all of slots are closed slots HS. Additionally, with this structure, magnetism mutually generated between coils 50 provided at core portions 32 each formed by stacking teeth 61 can be suppressed from sneaking around, and therefore, efficiency of the electric motor 1 can be further improved.

Figure 7:
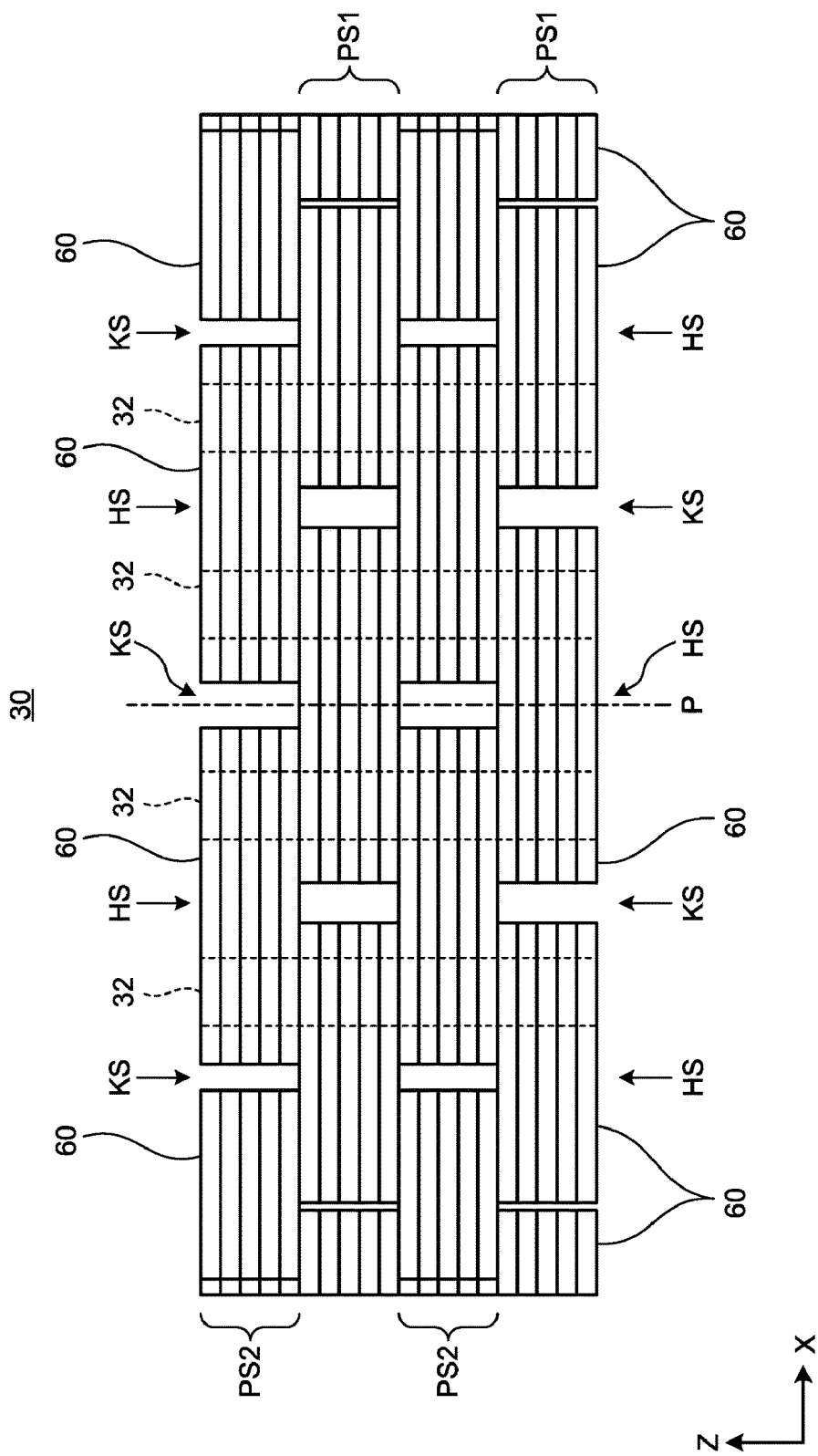
FIG. 7 is a diagram illustrating an example in a case where electromagnetic steel sheet layers having same phases are consecutively stacked.

FIG. 7 is a diagram illustrating an example in a case where electromagnetic steel sheet layers having the same phases are consecutively stacked. In the example illustrated in FIG. 3, electromagnetic steel sheet layers adjacent to each other in the rotation axis direction have different phases each arranged with a plurality of electromagnetic steel sheets 60, but this is only an example representing a relation between phases of stacked electromagnetic steel sheet layers, and the structure is not limited thereto. For example, as illustrated in FIG. 7, the number of consecutive same phases may be two or more. The number of consecutive same phases represents the number in which electromagnetic steel sheet layers having the same phases are consecutively arranged in the rotation axis direction. In the example illustrated in FIG. 7, the number of consecutive same phases is five, but may also be an arbitrary natural number such as four or less or six or more.

Figure 8:
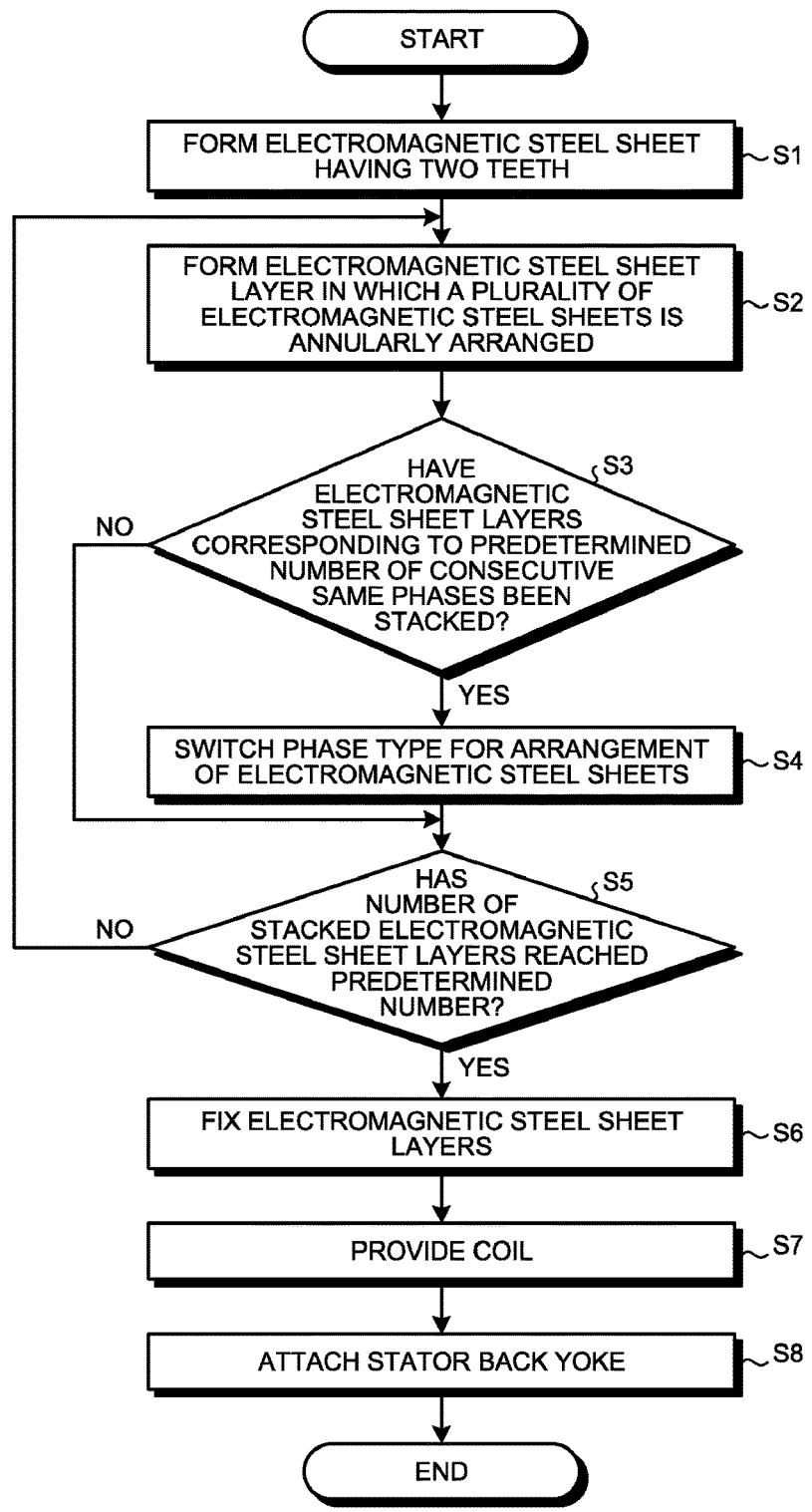
FIG. 8 is a flowchart illustrating an exemplary flow of manufacturing processes for a stator in manufacturing processes for an electric motor.

FIG. 8 is a flowchart illustrating an exemplary flow of, particularly, manufacturing processes for a stator in manufacturing processes for an electric motor. First, an electromagnetic steel sheet 60 having two teeth 61 is formed (Step S1). Specifically, a plurality of electromagnetic steel sheets 60 having the same shapes can be formed at a time by collectively punching a plurality of non-oriented stacked electromagnetic steel sheets by using a mold corresponding to a shape of the electromagnetic steel sheet 60 as illustrated in FIG. 4, for example. The number of electromagnetic steel sheets 60 formed at a time is arbitrary. Additionally, a thickness of each of the plurality of non-oriented stacked electromagnetic steel sheets at the time of punching is, for example, a thickness corresponding to a thickness of one electromagnetic steel sheet layer illustrated in FIG. 4, for example, and the thickness is uniform.

Next, one electromagnetic steel sheet layer is formed by annularly arranging a plurality of electromagnetic steel sheets 60 in accordance with a diameter of the stator yoke 30 (Step S2). The process in Step S2 is repeated a plurality of times. During the repetition, a plurality of electromagnetic steel sheet layers constituting the stator yoke 30 is stacked by arranging electromagnetic steel sheets 60 constituting a next electromagnetic steel sheet layer so as to be stacked on an electromagnetic steel sheet layer formed immediately before. Additionally, during the repetition of the process in Step S2, every time electromagnetic steel sheet layers corresponding to the predetermined number of consecutive same phases are stacked (Step S3; Yes), a phase type for arrangement of the electromagnetic steel sheets 60 constituting one electromagnetic steel sheet layer is switched to the other phase type (Step S4). Meanwhile, in the example illustrated in FIG. 3, it is assumed that number of consecutive same phases is one. In the present embodiment, the stator yoke 30 is formed by stacking a plurality of electromagnetic steel sheet layers in each of which a plurality of electromagnetic steel sheets 60 is annularly arranged as described above. Here, there are two types of phases for arrangement of a plurality of electromagnetic steel sheets 60 in one electromagnetic steel sheet layer. Additionally, the stator yoke 30 includes electromagnetic steel sheet layers having the two types of phases. In the present embodiment, a plurality of electromagnetic steel sheet layers is stacked by executing the process in Step S4 at least once. The electromagnetic steel sheet layers are stacked by repeating formation of an electromagnetic steel sheet layer in the process of Step S2 until the stacking number of electromagnetic steel sheet layers reaches predetermined number (Step S5; No). The processing in Step S2 from the second time is performed at a position where a next electromagnetic steel sheet layer is to be stacked on an electromagnetic steel sheet layer immediately before. With the above processing, the electromagnetic steel sheet layers are stacked.

In a case where stacking of the predetermined stacking number of electromagnetic steel sheet layers is completed (Step S5; Yes), the electromagnetic steel sheets 60 constituting the stacked electromagnetic steel sheet layers are fixed (Step S6). As a fixing method thereof, for example, impregnation of an adhesive, welding, caulking, or the like can be applied for the stacked electromagnetic steel sheet layers, but these methods are merely examples and not limited thereto, and modification can be suitably made. For example, an electromagnetic steel sheet 60 may be formed by using an adhesive steel sheet.

Next, a coil 50 in which stacked teeth 61 serves as a core is provided (Step S7). Specifically, the electromagnetic steel sheet layers are stacked and fixed, thereby forming a core portion 32 in which a coil 50 can be disposed at the teeth 61 continuous in the rotation axis direction. The coil 50 may be disposed by fitting an electric wire such as a copper wire preliminarily wound in accordance with an outer diameter of the core portion 32 or may be formed by winding an electric wire around the core portion 32. Meanwhile, in a case where two teeth 61 included in an electromagnetic steel sheet 60 are not continuously formed on the opposite side of the rotor 10 like the present embodiment, a coil 50 can be disposed by fitting an electric wire preliminarily wound in accordance with the outer diameter of the core portion 32, and therefore, a process to provide the coil 50 can be simplified.

Next, the stator back yoke 40 is attached to the stator yoke 30 provided with the coil 50 (Step S8). Specifically, the stator back yoke 40 is fitted on the inner side of the stator yoke 30, as illustrated in FIG. 1, for example. The stator yoke 30 and the stator back yoke 40 may be fixed by a method such as impregnation with an adhesive, welding, caulking, or the like.

As described above, according to the present embodiment, a large number of teeth 61 can be provided in one electromagnetic steel sheet layer by annularly arranging electromagnetic steel sheets 60 while each of the electromagnetic steel sheets 60 has two teeth 61, and therefore, non-uniformity in shapes of the teeth 61 can be further reduced. In other words, since integrally formed two teeth 61 are provided in one electromagnetic steel sheet 60, accuracy for consistency in the shapes of all of the teeth 61 can be secured by securing accuracy for consistency in the shapes of the two teeth 61. Additionally, since a plurality of electromagnetic steel sheets 60 is annularly arranged in one electromagnetic steel sheet layer, even in a case where one electromagnetic steel sheet 60 has a magnetic orientation property, one electromagnetic steel sheet layer is hardly dominated by the magnetic orientation property owned by this one electromagnetic steel sheet 60, and non-uniformity in magnetic characteristics of teeth 61 can be further reduced. Furthermore, since electromagnetic steel sheet layers having the two different types of phases in each of which electromagnetic steel sheets 60 each having two teeth 61 are annularly arranged are stacked, sufficient rigidity can be secured by the three-dimensional structure formed by stacking the electromagnetic steel sheet layers having the different phases.

Additionally, phases each arranged with electromagnetic steel sheets 60 are shifted from each other by one tooth 61 between the two types of phases. Therefore, electromagnetic steel sheets 60 each having two teeth 61 are arranged alternately at a position where electromagnetic steel sheet layers having the different phases are stacked. Therefore, since an annularly continuous structure can be formed by stacking electromagnetic steel sheets 60 of the different phases, sufficient rigidity can be secured as an annular structure body.

Additionally, two teeth 61 included in an electromagnetic steel sheet 60 are not continuously formed on the opposite side of the rotor 10. Therefore, a coil 50 preliminarily formed can be fitted to a core formed by stacking the teeth 61, and the coil 50 can be easily provided.

Furthermore, a plurality of electromagnetic steel sheets 60 in one electromagnetic steel sheet layer is arranged apart from each other. Therefore, more weight reduction can be achieved compared to a structure where an electromagnetic steel sheet layer is completely annularly continuous. Additionally, since magnetism mutually generated between coils 50 can be suppressed from sneaking around, efficiency of the electric motor 1 can be further improved.

Also, the number of electromagnetic steel sheet layers having one of the two types of phases is equal to the number of electromagnetic steel sheet layers having the other type thereof. Therefore, the entire stator 20 can be easily well balanced in its strength and magnetic characteristics.

Additionally, electromagnetic steel sheet layers adjacent to each other in the rotation axis direction have different phases each arranged with a plurality of electromagnetic steel sheets 60. Therefore, electromagnetic steel sheets 60 each having two teeth 61 are arranged alternately at a position where the two electromagnetic steel sheet layers are stacked. Therefore, since an annularly continuous structure can be formed by stacking the electromagnetic steel sheets 60 having different phases, sufficient rigidity can be more surely secured as the annular structure body.

Furthermore, in the base portion 62 that physically connects two teeth 61 in one electromagnetic steel sheet 60, a portion corresponding to a middle point between the two teeth 61 is formed thinner than other portions. Therefore, magnetism mutually generated between coils 50 adjacent to each other in the annular direction can be suppressed from sneaking around, and efficiency of the electric motor 1 can be further improved.

Additionally, the stator 20 has a cylindrical yoke provided on the opposite side of the rotor 10 with respect to teeth 61, and the yoke is integrally formed in the rotation axis direction. Therefore, since the stator 20 is supported by the yoke integrally formed in the stacking direction of electromagnetic steel sheet layers, sufficient rigidity can be more surely secured.

The electric motor 1 described in the first embodiment is the so-called outer rotor electric motor where the rotor 10 is positioned on an outer side of the stator 20, but this is only an example and not limited thereto, and modification can be suitably made.

Second Embodiment

Figure 9:
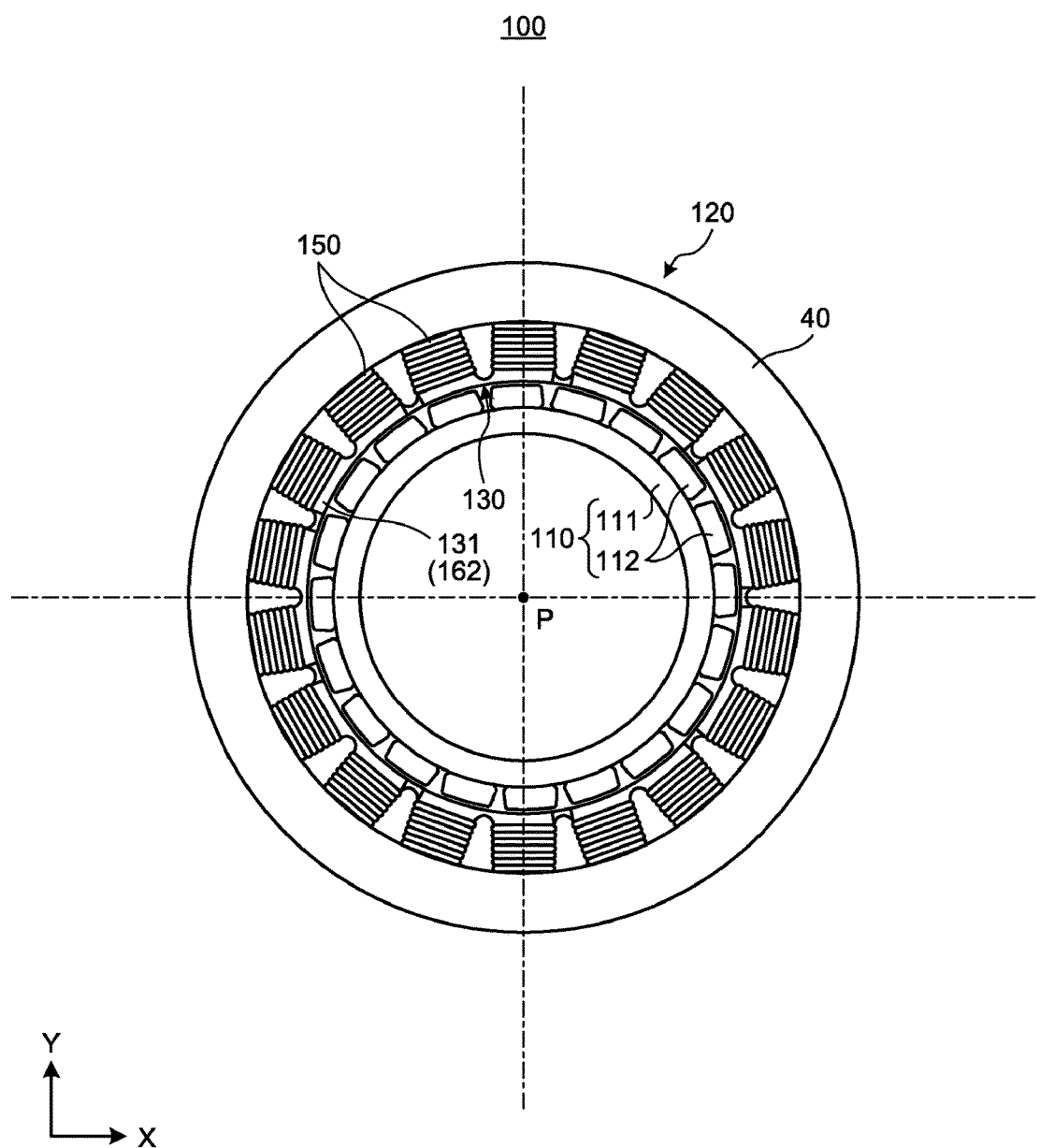
FIG. 9 is a diagram illustrating main components of an electric motor according to a second embodiment of the present invention.
Figure 10:
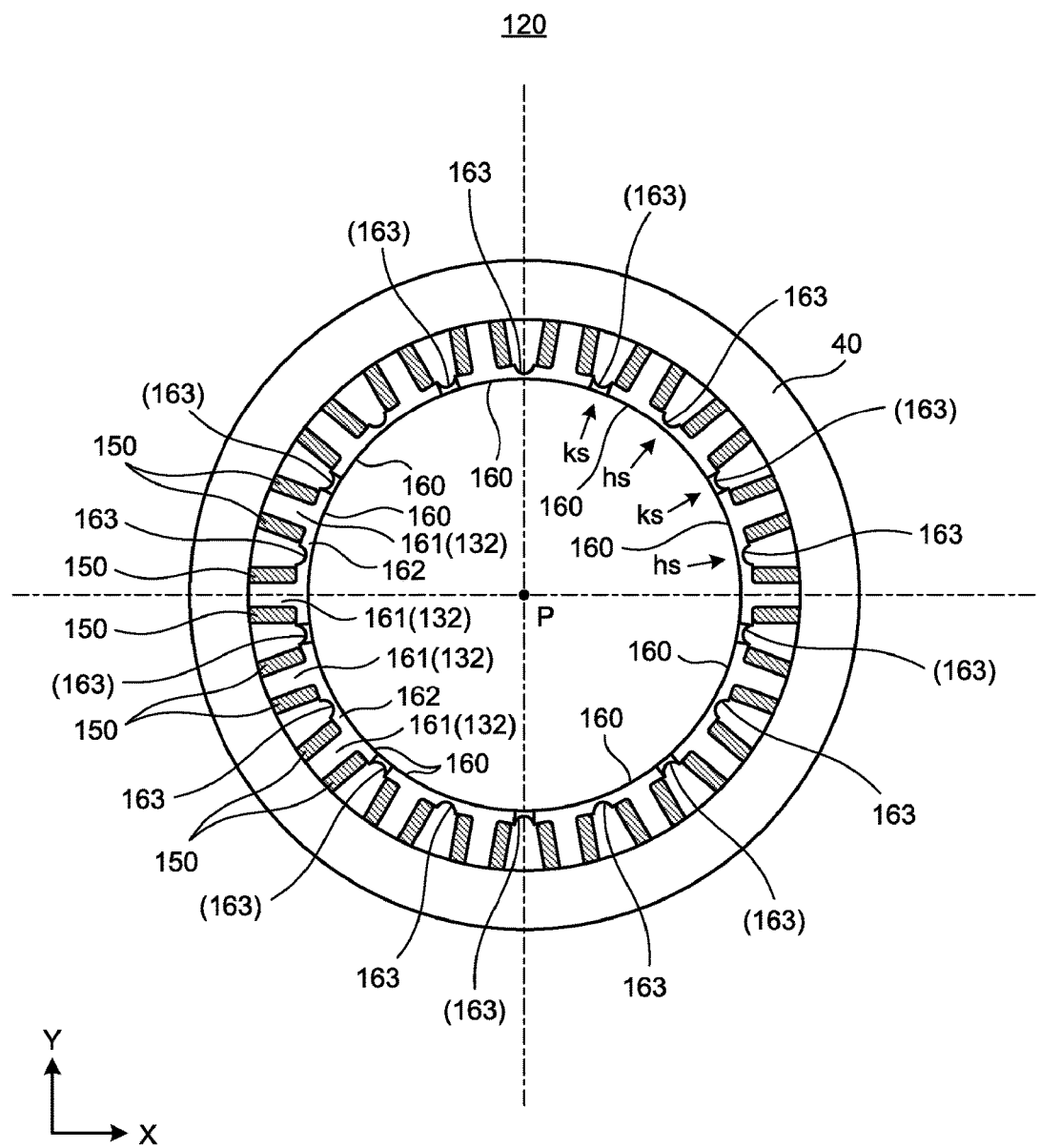
FIG. 10 is a diagram illustrating an example of a specific structure of a stator according to the second embodiment.
Figure 11:
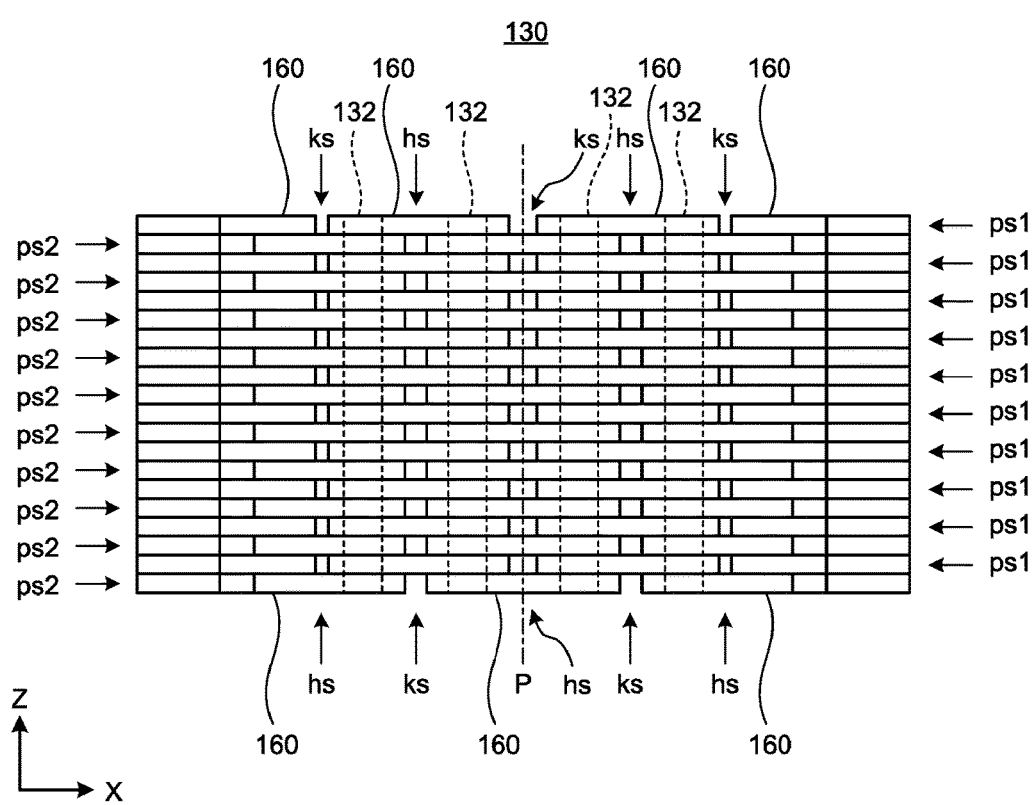
FIG. 11 is a diagram illustrating a stacked structure of electromagnetic steel sheet layers included in a stator yoke according to the second embodiment.
Figure 12:
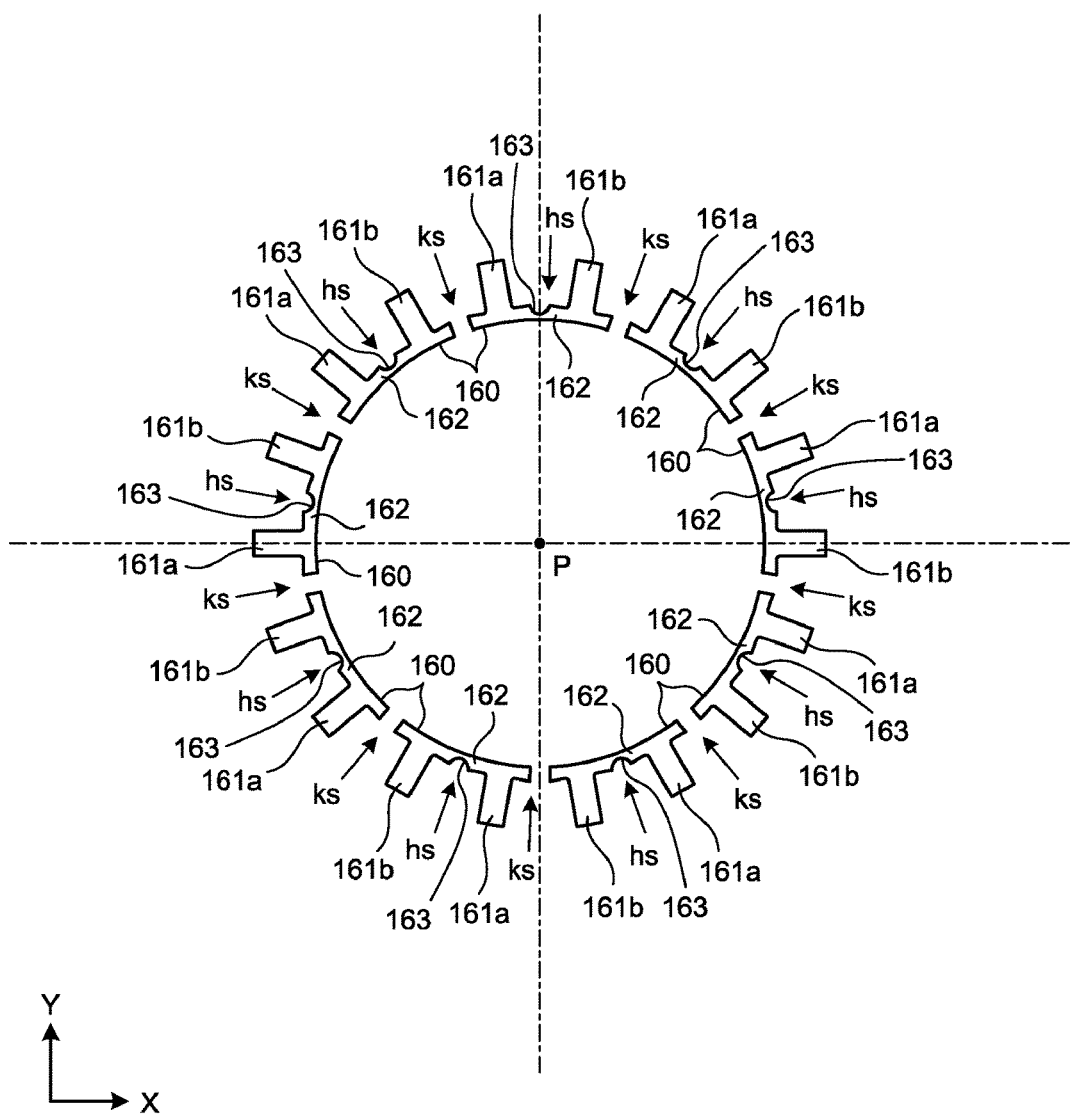
FIG. 12 is a diagram illustrating one of two types of phases for arrangement of a plurality of electromagnetic steel sheets in one electromagnetic steel sheet layer.
Figure 13:
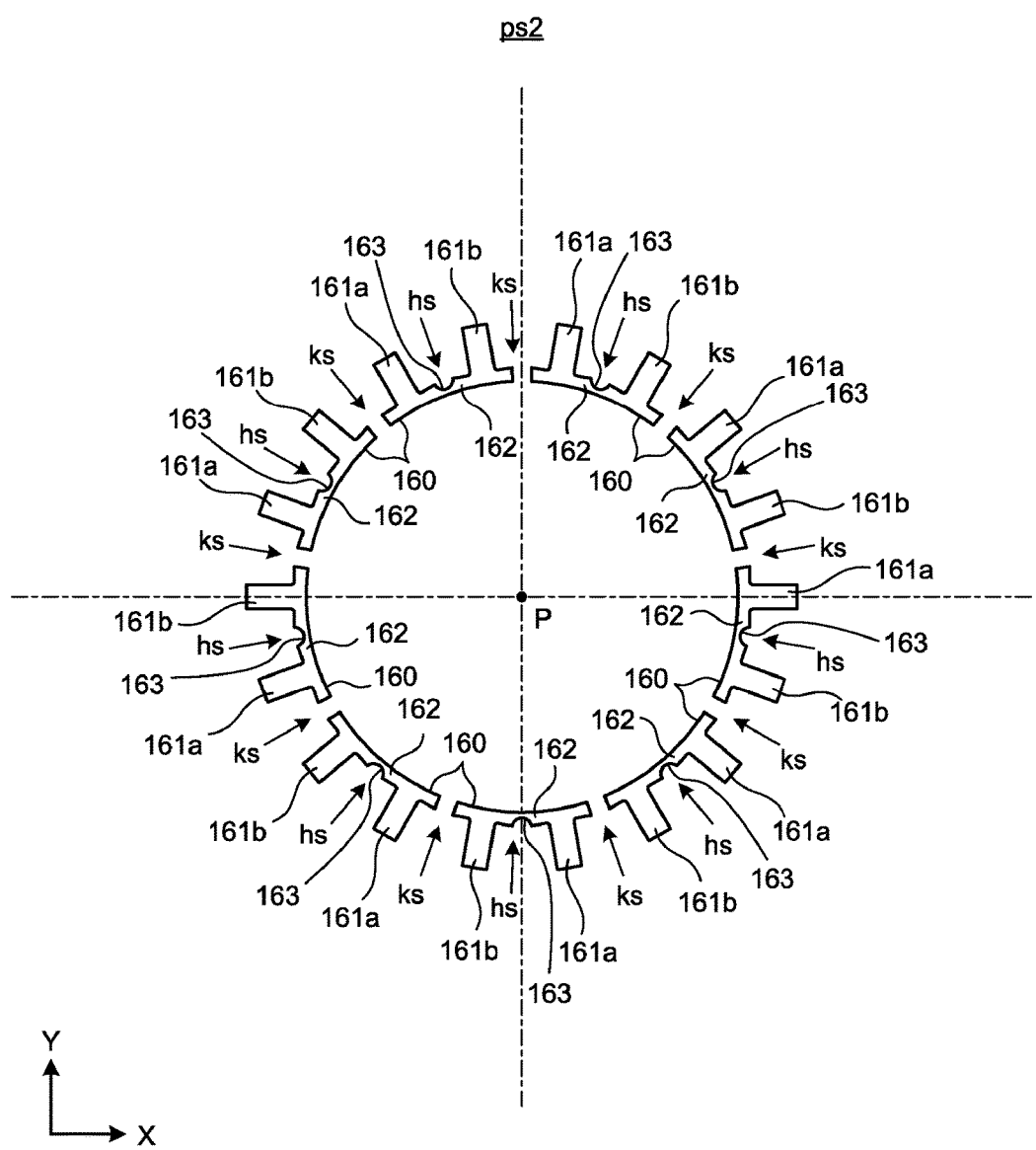
FIG. 13 is a diagram illustrating the other one of the two types of phases for arrangement of a plurality of electromagnetic steel sheets in one electromagnetic steel sheet layer.
Figure 14:
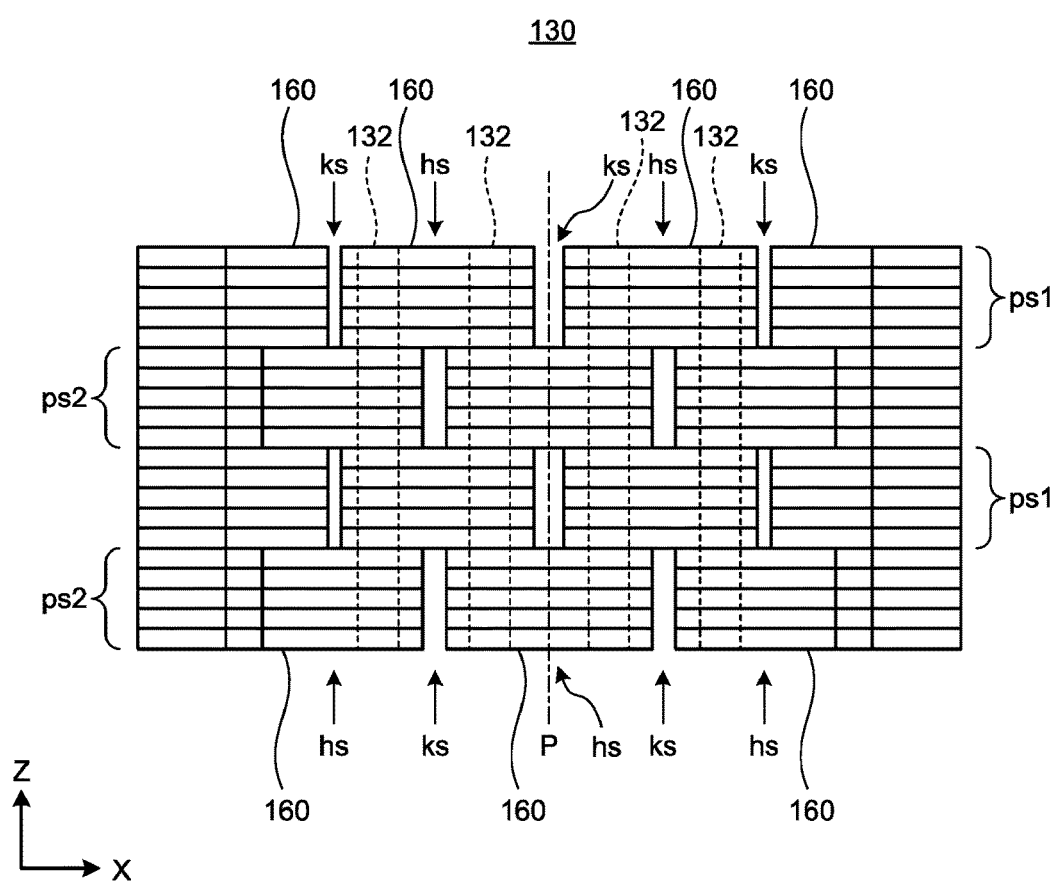
FIG. 14 is a diagram illustrating another example in a case where electromagnetic steel sheet layers having same phases are consecutively stacked.

FIG. 9 is a diagram illustrating main components of an electric motor 100 according to a second embodiment of the present invention. FIG. 10 is a diagram illustrating an example of a specific structure of a stator 120 according to the second embodiment. FIG. 11 is a diagram illustrating a stacked structure of electromagnetic steel sheet layers included in a stator yoke 130 according to the second embodiment. FIG. 12 is a diagram illustrating one of two types of phases for arrangement of a plurality of electromagnetic steel sheets 160 in one electromagnetic steel sheet layer. FIG. 13 is a diagram illustrating the other one of the two types of phases for arrangement of a plurality of electromagnetic steel sheets 160 in one electromagnetic steel sheet layer. FIG. 14 is a diagram illustrating another example in a case where electromagnetic steel sheet layers having the same phases are consecutively stacked. The electric motor 100 according to the second embodiment is a so-called inner rotor electric motor 100 in which a rotor 110 is located on an inner side of the stator 120 as illustrated in FIG. 9, for example. In the so-called inner rotor electric motor 100, two teeth 161 projecting toward the outside of an arc of a base portion 162 are provided in an electromagnetic steel sheet 160. The base portion 162 does not necessarily have an arc shape. As illustrated in FIGS. 9, 10, and the like, for example, a side of a base portion 162 from which teeth 161 project may have a straight line orthogonal to the projecting direction of the teeth 161.

In the second embodiment, as illustrated in FIG. 9, the stator is located on an outer peripheral side with respect to a rotor yoke 111. In the second embodiment, a plurality of magnets 112 included in the rotor is annularly arranged along an outer peripheral surface of the rotor yoke 111. Additionally, in the second embodiment, a coil 150 is provided on an outer side of the stator yoke 130 as illustrated in FIGS. 9 to 13. Furthermore, a stator back yoke 40 of the second embodiment is provided on the outer side of the stator yoke 130. The electric motor 100 according to the second embodiment may have characteristics similar to characteristics of an electric motor 1 according to a first embodiment except for particularly specified matters concerning differences between the electric motor 100 of the inner rotor and the electric motor 1 of an outer rotor described above. For example, as described with reference to FIG. 7 according to the first embodiment, the number of consecutive same phases can be set arbitrarily also in the second embodiment as illustrated in FIG. 14.

Additionally, except for the particularly specified matters concerning the differences between the electric motor 100 of the inner rotor and the electric motor 1 of the outer rotor described above, descriptions for respective components including a rotor 10, a rotor yoke 11, a magnet 12, a stator 20, a stator yoke 30, an edge portion 31, a core portion 32, a coil 50, an electromagnetic steel sheet 60, teeth 61, 61a, 61b, a base portion 62, an intermediate portion 63, a closed slot HS, an open slot KS, an electromagnetic steel sheet layer of a first phase PS1, and an electromagnetic steel sheet layer of a second phase PS2 included in the description for the electric motor 1 of the first embodiment can be interpreted as a description for the electric motor 100 according to the second embodiment by replacing reference signs of the respective components by the rotor 110, the rotor yoke 111, the magnet 112, the stator 120, the stator yoke 130, an edge portion 131, a core portion 132, a coil 150, an electromagnetic steel sheet 160, teeth 161, 161a, 161b, the base portion 162, an intermediate portion 163, a closed slot hs, an open slot ks, an electromagnetic steel sheet layer of a first phase ps1, and an electromagnetic steel sheet layer of a second phase ps2.

Third Embodiment

Figure 15:
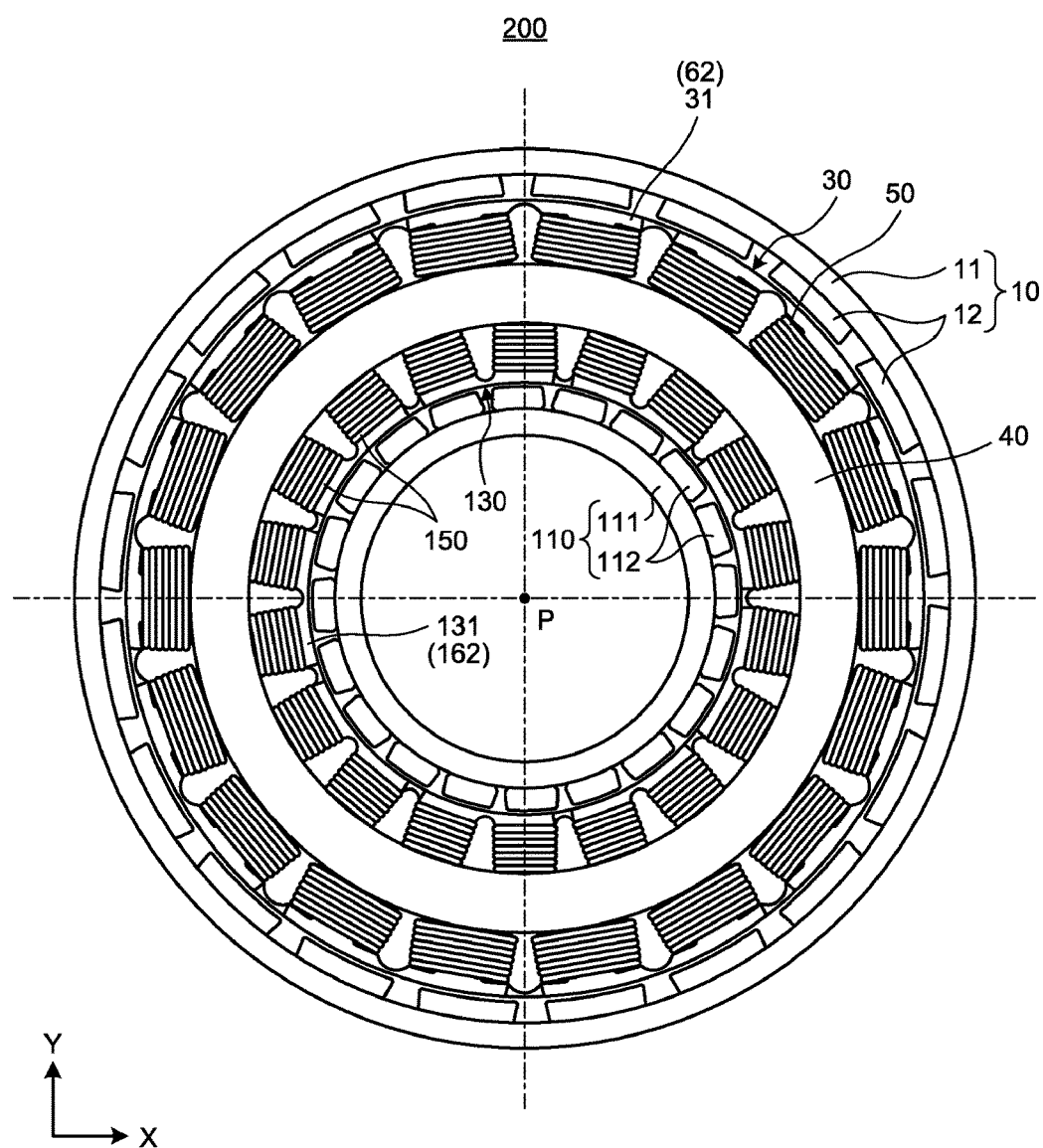
FIG. 15 is a diagram illustrating main components of an electric motor according to a third embodiment of the present invention.
Figure 16:
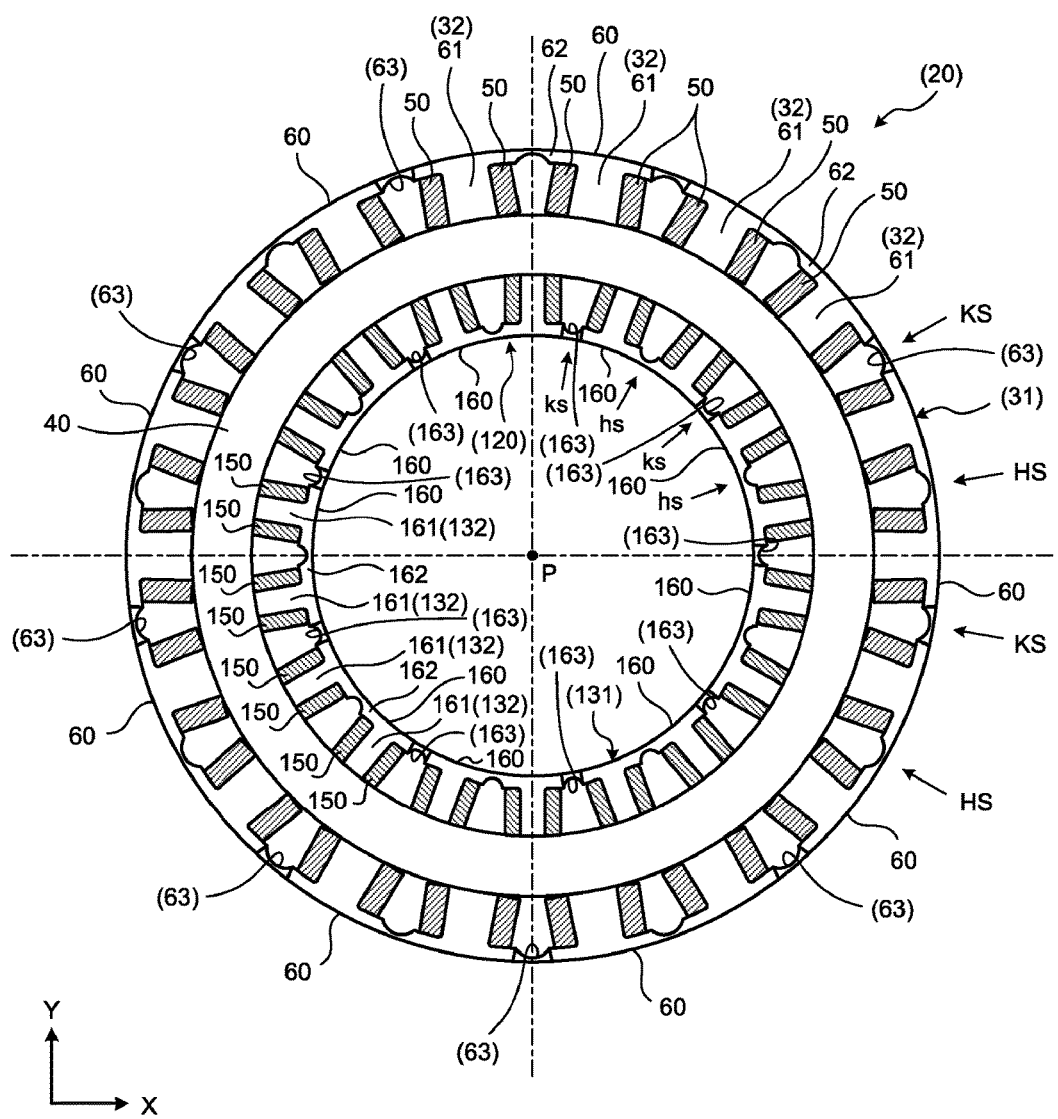
FIG. 16 is a diagram illustrating an example of a specific structure of a stator yoke according to the third embodiment.

FIG. 15 is a diagram illustrating main components of an electric motor 200 according to a third embodiment of the present invention. FIG. 16 is a diagram illustrating an example of specific structures of stators 20, 120 according to the third embodiment. The electric motor 200 is, for example, a so-called dual-axis integrated electric motor 200 including: a rotor 110 provided on the inner side of the stator 120 as illustrated in FIG. 9, for example; and a rotor 10 provided on an outer side the stator 20. As illustrated in FIGS. 15 and 16, a stator yoke 30 corresponding to the outer rotor and a stator yoke 130 corresponding to the inner rotor are independently provided in the electric motor 200 according to the third embodiment. The stator yoke 30 corresponding to the outer rotor is similar to a stator yoke 30 according to a first embodiment. The stator yoke 130 corresponding to the inner rotor is similar to a stator yoke 130 according to a second embodiment. The two stator yokes 30, 130 of the electric motor 200 according to the third embodiment share one stator back yoke 40 as illustrated in FIGS. 15 and 16, but this is only an example and the structure is not limited thereto. The electric motor that is a dual-axis integrated motor may have, for example, a stator back yoke 40 individually provided in each of the stator yokes 30, 130.

Additionally, in the dual-axis integrated motor like the electric motor 200, electromagnetic steel sheets 60, 160 located at the same position in a rotation axis direction and constituting an electromagnetic steel sheet layer may be arranged as illustrated in, for example, FIGS. 15 and 16 such that an open slot KS and an open slot ks are not positioned on one straight line orthogonal to a rotation axis P. With this arrangement, a phase having the open slot KS and the closed slot HS in the stator yoke 30 on the outer side and a phase having the open slot ks and the closed slot hs in the stator yoke 130 on the inner side can be shifted from each other, and sufficient rigidity can be more surely secured.

The electric motor according to the present embodiment can be used as an actuator of various industrial machines such as a conveyor for small-sized components, an electronic component inspection device, a semiconductor inspection device, and the like, but not limited thereto.

REFERENCE SIGNS LIST 1, 100, 200 Electric motor
10, 110 Rotor
11, 111 Rotor yoke
12, 112 Magnet
20, 120 Stator
30, 130 Stator yoke
31, 131 Edge portion
32, 132 Core portion
40 Stator back yoke
50, 150 Coil
60, 160 Electromagnetic steel sheet
61, 61a, 61b, 161, 161a, 161b Teeth
62, 162 Base portion
63, 163 Intermediate portion
HS, hs Closed slot
KS, ks Open slot
P Rotation axis
PS1, ps1 Electromagnetic steel sheet layer of first phase
PS2, ps2 Electromagnetic steel sheet layer of second phase

The invention claimed is:

1. An electric motor comprising:
a rotor having a rotor yoke and a magnet; and
a stator formed by stacking, in a rotation axis direction of the rotor, a plurality of electromagnetic steel sheet layers in each of which a plurality of electromagnetic steel sheets each having two teeth is annularly arranged, wherein
a core of a coil provided in the stator is formed of the teeth stacked in the rotation axis direction,
there are two types of phases for arrangement of a plurality of the electromagnetic steel sheets in the one electromagnetic steel sheet layer,
the stator includes electromagnetic steel sheet layers having the two types of phases,
a cylindrical yoke is provided on an opposite side of the rotor with respect to the stator,
the rotor and the stator are disposed one by one at facing positions sandwiching the yoke,
a plurality of the electromagnetic steel sheets arrayed in a circumferential direction around the rotation axis of the rotor in the electromagnetic steel sheet layers included in each of the two stators is arranged apart from each other, and
a gap between the electromagnetic steel sheets arrayed in the circumferential direction around the rotation axis in one electromagnetic steel sheet layer included in one of the two stators and a gap between the electromagnetic steel sheets arrayed in the circumferential direction around the rotation axis in one electromagnetic steel sheet layer located at the same position as the one electromagnetic steel sheet layer in the rotational axis direction and included in the other stator are not positioned on one straight line orthogonal to the rotation axis of the rotor.

2. The electric motor according to claim 1, further comprising:
a cylindrical yoke provided on an opposite side of the rotor with respect to the teeth and integrally formed in the rotation axis direction, wherein the yoke is made of iron or a powder magnetic core.

3. The electric motor according to claim 1, wherein
in a base portion physically connecting the two teeth in one electromagnetic steel sheet, a portion corresponding to a middle point between the two teeth is formed thinner than other portions, and
the intermediate portion has an edge of a side from which the teeth project curved with respect to the base portion.

4. The electric motor according to claim 1, wherein
phases each arranged with the electromagnetic steel sheets are shifted from each other by one tooth between the two types of phases.

5. The electric motor according to claim 1, wherein
the electromagnetic steel sheet arranged in the electromagnetic steel sheet layer has the two teeth projecting toward an opposite side of the rotor from a base portion located on the rotor side with respect to the two teeth, and
the two teeth included in the electromagnetic steel sheet are not continuously formed on the opposite side of the rotor.

6. The electric motor according to claim 1, wherein the number of electromagnetic steel sheet layers having one of the two types of phases is equal to the number of electromagnetic steel sheet layers having the other type.

7. The electric motor according to claim 1, wherein
electromagnetic steel sheet layers adjacent to each other in the rotation axis direction have different phases for arrangement of a plurality of the electromagnetic steel sheets.

8. A manufacturing method for an electric motor, comprising:
forming a stator by stacking a plurality of electromagnetic steel sheet layers in which a plurality of electromagnetic steel sheets each having two teeth is annularly arranged; and
providing a coil in which the stacked teeth serves as a core,
wherein there are two types of phases for arrangement of a plurality of the electromagnetic steel sheets in the one electromagnetic steel sheet layer,
the stator includes electromagnetic steel sheet layers having the two types of phases,
a cylindrical yoke is provided on an opposite side of the rotor of the electric motor with respect to the stator,
the rotor and the stator are disposed one by one at facing positions sandwiching the yoke,
a plurality of the electromagnetic steel sheets arrayed in a circumferential direction around the rotation axis of the rotor in the electromagnetic steel sheet layers included in each of the two stators is arranged apart from each other, and
a gap between the electromagnetic steel sheets arrayed in the circumferential direction around the rotation axis in one electromagnetic steel sheet layer included in one of the two stators and a gap between the electromagnetic steel sheets arrayed in the circumferential direction around the rotation axis in one electromagnetic steel sheet layer located at the same position as the one electromagnetic steel sheet layer in the rotational axis direction and included in the other stator are arranged in a manner not positioned on one straight line orthogonal to the rotation axis of the rotor.

* * * * *